United States Patent

[11] 3,592,291

[72] Inventors George E. Medawar
San Diego;
Felix Hom, La Mesa, both of, Calif.
[21] Appl. No. 877,408
[22] Filed Nov. 17, 1969
[45] Patented July 13, 1971
[73] Assignee Rohr Corporation
Chula Vista, Calif.

[54] METHOD AND APPARATUS FOR SUPPRESSING THE NOISE AND AUGMENTING THE THRUST OF A JET ENGINE
5 Claims, 3 Drawing Figs.

[52] U.S. Cl. ................................................ 181/33 HC,
181/51, 239/127.3, 239/265.17
[51] Int. Cl. ..................................................... B64d 33/06,
F01n 1/14
[50] Field of Search ........................................... 239/127.1,
127.3, 265.11, 265.13, 265.17, 265.33, 265.37,
265.39, 265.41; 181/33.22, 33.221, 33.222, 43,
51, 33

[56] References Cited
UNITED STATES PATENTS
| | | | |
|---|---|---|---|
| 2,944,624 | 7/1960 | Morley | 239/265.11 |
| 3,002,341 | 10/1961 | Muzzy et al. | 239/265.17 |
| 3,153,319 | 10/1964 | Young et al. | 181/33 (.221) |
| 3,227,240 | 1/1966 | Lee et al. | 181/33 (.221) |
| 3,415,337 | 12/1968 | Karasievich | 239/265.11 X |

Primary Examiner—Robert S. Ward, Jr.
Attorney—George E. Pearson

ABSTRACT: Thrust gas of a jet engine is discharged through a lobed nozzle having apertures formed in the wall thereof at the crest of each lobe of the nozzle and at the bottom of each valley between the lobes. The apertures are in the form of flush inlet scoops so that slipstream air flowing past the nozzle enters said apertures and mixes with thrust gas flowing through the nozzle.

INVENTOR.
GEORGE E. MEDAWAR
FELIX HOM

BY Edwin D. Grant
ATTORNEY

METHOD AND APPARATUS FOR SUPPRESSING THE NOISE AND AUGMENTING THE THRUST OF A JET ENGINE

SUMMARY OF THE INVENTION

This invention relates to jet-propelled aircraft and more particularly to a method and apparatus for suppressing the noise generated by exhaust gas streams of such aircraft while augmenting the thrust thereof.

Part of the noise associated with the operation of a jet-propelled aircraft results from the flow through the atmosphere of the high-velocity, high-temperature exhaust gas which is discharged from the engine, or engines, thereof. The amount of noise so generated by streams of exhaust gas is proportionate to their temperature and velocity. In accordance with the principles of the invention disclosed herein, exhaust gas of a jet engine (or exhaust gas and fan air, where the invention is used in connection with a fan jet engine) is discharged to the atmosphere through a lobed thrust nozzle having apertures in the wall thereof. The nozzle is provided with flush inlet scoops which cause slipstream air to flow through the apertures and into the stream of exhaust gas. The temperature and velocity of the stream of mixed air and exhaust gas which is discharged from the nozzle are thus less than the temperature and velocity of the exhaust gas, which suppresses the noise of operation of the propulsion assembly. In addition, some slipstream air flows between the lobes of the nozzle and thence between the streams of mixed air and exhaust gas issuing therefrom, which further cools the jet stream and lowers its velocity to provide additional sound suppression.

More specifically, in a preferred embodiment of the present invention a thrust nozzle is attached at its cylindrical forward end to the aft end of a housing that encloses a jet engine. The nozzle is formed with a plurality of axially extending, circumferentially spaced lobes that increase in radial dimension in the downstream direction so that the aft edge of the nozzle has a daisy-petal shape. Axially spaced apart along the crest of each lobe are a pair of apertures which extend through the wall of the nozzle. A pair of apertures are also axially spaced apart along the bottom of each valley between the lobes of the nozzle. The apertures are in the form of flush inlet scoops recessed in the wall of the nozzle to provide therein longitudinally extending channels which gradually increase in depth in the downstream direction and which communicate at their aft ends with the interior of the nozzle, whereby slipstream air flows along said channels and into the exhaust gas discharged from the jet engine into the nozzle. This air not only suppresses noise of the thrust stream discharged from the nozzle, but also augments the thrust of the propulsion assembly.

DETAILED DESCRIPTION

Figure 1:
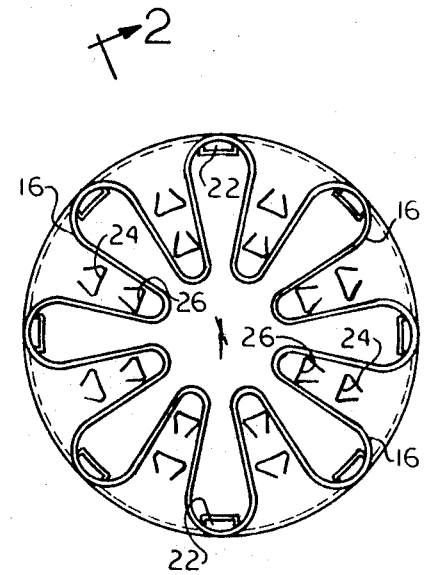
FIG. 1 is a rear elevation of the preferred embodiment of this invention.

As illustrated in the drawings, a preferred embodiment of this invention comprises a nozzle which is designated generally by reference number 10 and the cylindrical forward end 12 of which is fixedly secured to the aft end of a housing 14 containing a jet engine (not shown). The wall of nozzle 10 is corrugated to form a plurality of lobes 16 which extend axially of said nozzle and are evenly spaced apart circumferentially thereof. More explicitly, the corrugations in the wall of the nozzle are shallow at the forward end 12 thereof and gradually increase in depth in the downstream direction. Thus the lobes increase in radial dimension in the downstream direction, and the aft edge 18 of the nozzle has a daisy-petal shape, as can be seen in FIG. 1.

Figure 3:
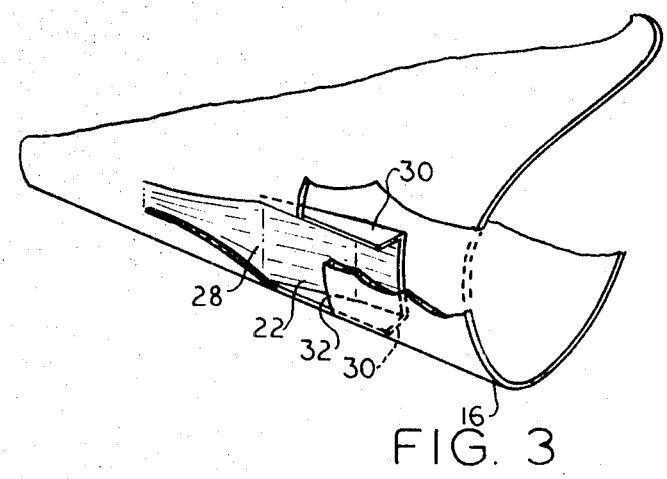
FIG. 3 is a fragmentary view of a portion of the thrust nozzle of said embodiment, part of the wall of said nozzle being broken away in the drawing so that underlying parts can be seen.
Figure 2:
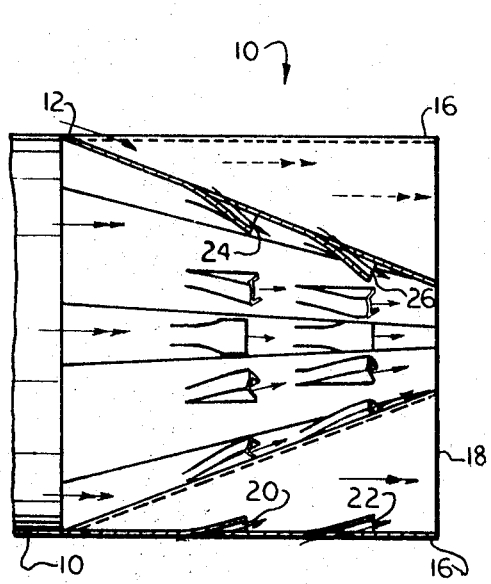
FIG. 2 is a longitudinal sectional view of said embodiment, taken along the offset planes represented by line 2-2 in FIG. 1 and in the direction indicated by arrows therein.

Extending through the wall of the nozzle at the crest of each lobe and axially spaced apart thereon are two apertures 20, 22 (see FIG. 2 wherein the apertures in the lowermost lobe are illustrated). A pair of apertures 24, 26 also extend through the wall of the nozzle at the bottom of each valley between the lobes and are spaced apart axially thereon. Each aperture 20, 22, 24, 26 is formed as a flush inlet scoop, as most clearly illustrated in FIG. 3 which depicts an aperture 22 that is typical of all of the apertures. At each aperture there is a wall 28 which extends inwardly from the adjacent portion of the nozzle wall and which is joined thereto by means of radially disposed sidewalls 30, the channel formed by said walls 28 and 30 gradually increasing in depth in the downstream direction and a section 32 of the nozzle wall lying over the aft portion thereof.

OPERATION

In FIG. 2 double-headed arrows illustrate the flow of exhaust gas discharged from the jet engine within housing 14. It will be noted that a portion of the exhaust gas flows through the central portion of the nozzle and the remainder thereof flows through the passages bounded by the inner surfaces of the nozzle lobes. As illustrated by single-headed arrows in FIG. 2, a portion of the slipstream air which flows along the crests of lobes 16 enters apertures 20, 22. A portion of the slipstream air which flows through the valleys between lobes 16 enters apertures 24, 26, and the remainder flows between the streams of mixed air and exhaust gas issuing from said lobes.

It will be recognized that the arrangement of nozzle 10 is such that air and exhaust gas are mixed together at a multiplicity of points within said nozzle, which reduces the noise generated by the exhaust gas as it travels through the atmosphere. The air introduced into the nozzle also increases the thrust of the propulsion assembly in accordance with well-known principles of jet propulsion. Air which flows between the streams of combined air and exhaust gas further reduces the noise of the jet stream by rapidly cooling said stream and lowering its velocity by creating turbulence therein.

If the engine within housing 14 is a fan jet engine, both fan air and exhaust gas are preferably discharged through nozzle 10. Hence it should be understood that the term "thrust gas" which appears in the appended claims is to be construed as including either exhaust gas or a mixture of exhaust gas and fan air. Various modifications can obviously be made in the embodiment of the invention which has been disclosed herein by way of illustration. For example, although the crests of lobes 16 are the same distance from the longitudinal axis of nozzle 10 along their entire length, in other embodiments of the invention the crests of the nozzle lobes may either converge or diverge relative to said axis. The scope of the disclosed invention should therefore be considered to be limited only by the t of the following claims.

What we claim as new and useful and desire to be secured by U.S. Letters Patent is:

1. In an aircraft having a jet engine, the combination comprising a nozzle through which thrust gas of said engine is discharged, said nozzle being exposed to the atmosphere so that slipstream air flows past the outer surface thereof during the flight of said aircraft and being formed with a plurality of apertures in the form of flush inlet scoops which extend inwardly through the wall thereof and are spaced apart circumferentially thereon and upstream from the aft end thereof, whereby a portion of said slipstream air flows through said apertures and mixes with said thrust gas inside said nozzle.

2. The combination defined in claim 1 wherein said nozzle is formed with a plurality of axially extending, circumferentially spaced lobes which increase in radial dimension in the downstream direction, and at least one aperture extends through the wall of each of said lobes.

3. The combination defined in claim 2 wherein at least one aperture extends through the wall of said nozzle at the crest of each of said lobes and at the bottom of each valley therebetween.

4. The combination defined in claim 2 wherein a plurality of said apertures are axially spaced apart along the crest of each of said lobes and along the bottom of each valley therebetween.

5. A method of operating an aircraft having a jet engine, which comprises passing thrust gas of said engine through a nozzle formed with a plurality of axially extending, circumferentially spaced lobes having a plurality of apertures in the form of flush inlet scoops extending inwardly through the wall thereof upstream of the aft end thereof, said nozzle being exposed to the atmosphere so that slipstream air flows past the outer surface thereof during the flight of said aircraft, whereby a portion of said slipstream air flows through said apertures into the nozzle and mixes with said thrust gas within the nozzle and a portion of said slipstream air flows through the valleys between said lobes and thence between the streams of mixed air and thrust gas issuing from said lobes.